US012780010B2

(12) United States Patent
Iimura et al.

(10) Patent No.: US 12,780,010 B2
(45) Date of Patent: Nov. 3, 2026

(54) MOVING BODY

(71) Applicant: HONDA MOTOR CO., LTD., Tokyo (JP)

(72) Inventors: Taiki Iimura, Saitama (JP); Shintaro Uchida, Saitama (JP); Nobuyuki Ohashi, Saitama (JP); Ritsuya Oshima, Saitama (JP); Jun Inada, Saitama (JP); Hiroshi Iwakami, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 18/907,753

(22) Filed: Oct. 7, 2024

(65) Prior Publication Data

US 2025/0121699 A1 Apr. 17, 2025

(30) Foreign Application Priority Data

Oct. 11, 2023 (JP) ................................ 2023-176229

(51) Int. Cl.
*B60L 15/20* (2006.01)
*B60B 19/00* (2006.01)

(52) U.S. Cl.
CPC ............ *B60L 15/20* (2013.01); *B60B 19/003* (2013.01); *B60L 2240/421* (2013.01); *B60L 2240/427* (2013.01); *B60L 2240/429* (2013.01)

(58) Field of Classification Search
CPC .... B60B 19/003; B60L 15/20; B60L 2240/42; B60L 2240/421; B60L 2240/423; B60L 2240/427; B60L 2240/429
See application file for complete search history.

(56) References Cited

U.S. PATENT DOCUMENTS

2011/0071715 A1* 3/2011 Akimoto ................ B62K 11/06 701/22
2022/0080966 A1* 3/2022 Sadamoto ........... B60W 30/146
(Continued)

FOREIGN PATENT DOCUMENTS

JP 2018148728 A * 9/2018
JP 2023019525 A 2/2023
(Continued)

OTHER PUBLICATIONS

JP_2018148728_A Translation (Year: 2018).*

*Primary Examiner* — Christopher B Wehrly
(74) *Attorney, Agent, or Firm* — Armstrong Teasdale LLP

(57) ABSTRACT

A moving body includes a pair of left and right omnidirectional wheels and a control device. Each omnidirectional wheel includes a pair of drive disks, a main wheel, a pair of electric motors, a pair of transmission mechanisms, a pair of electric current sensors, and a pair of angular velocity sensors. The control device acquires an actual electric current value of each electric motor based on a signal from each electric current sensor, calculates, based on the actual electric current value of each electric motor, a component along a reference line of a driving force of each omnidirectional wheel, the reference line connecting ground contact points of the omnidirectional wheels, and determines that there is an abnormality when an absolute value of a difference between the components along the reference line of the driving forces of the omnidirectional wheels is greater than or equal to a predetermined determination value.

4 Claims, 14 Drawing Sheets

(56) References Cited

U.S. PATENT DOCUMENTS

| | | | | |
|---|---|---|---|---|
| 2022/0370270 | A1* | 11/2022 | Raja | B60L 15/2036 |
| 2023/0035700 | A1 | 2/2023 | Iimura et al. | |
| 2023/0271498 | A1* | 8/2023 | Behling | B60K 23/0808 701/69 |

FOREIGN PATENT DOCUMENTS

| | | | | | |
|---|---|---|---|---|---|
| WO | WO-2012079541 | A1 * | 6/2012 | | B66F 9/07577 |
| WO | WO-2023112306 | A1 * | 6/2023 | | B60L 15/20 |

* cited by examiner

MOVING BODY

TECHNICAL FIELD

The present invention relates to a moving body having a pair of omnidirectional wheels.

BACKGROUND ART

JP2023-19525A discloses a moving body having a pair of left and right omnidirectional wheels. Each of the omnidirectional wheels includes a pair of drive disks, an annular main wheel disposed between the drive disks, and a pair of electric motors for rotating the respective drive disks. Each of the electric motors is connected to the corresponding drive disk via a transmission mechanism. The main wheel includes a core having a circular annular shape and multiple driven rollers rotatably supported by the core and contacting the pair of drive disks. When the electric motors rotate the corresponding drive disks, the driven rollers rotate about their respective axes and/or the axis of the core, whereby the omnidirectional wheel undergoes translational movement in an arbitrary direction which may be a forward, rearward, leftward, or rightward direction. Also, the moving body turns when a difference occurs between the rotation speeds of the left and right omnidirectional wheels.

In such a moving body, if an abnormality such as belt detachment or belt breakage occurs in any of the transmission mechanisms, the corresponding drive disk does not rotate according to the rotation of the electric motor. However, the drive disk receives a friction force from the main wheel and rotates with the main wheel. In this case, a change in the behavior of the moving body may be small and the user may not be able to recognize occurrence of an abnormality. However, if an abnormality such as belt detachment or belt breakage occurs in any of the transmission mechanisms, the drive torque generated by the corresponding electric motor or the braking torque generated by a braking device provided in the corresponding electric motor is not transmitted to the drive disk. Therefore, it is preferred that an abnormality in the transmission mechanisms be detected early.

SUMMARY OF THE INVENTION

In view of the foregoing background, a primary object of the present invention is to provide a moving body capable of detecting an abnormality in the transmission mechanisms.

To achieve the above object, one aspect of the present invention provides a moving body (1), comprising: a vehicle body (2); a pair of left and right omnidirectional wheels (3) provided on the vehicle body; and a control device (7) configured to control the pair of omnidirectional wheels, wherein each of the omnidirectional wheels comprises a pair of drive disks (18), an annular main wheel (19) disposed between the drive disks, a pair of electric motors (20) each configured to rotate a corresponding one of the drive disks, a pair of transmission mechanisms (24) each configured to transmit a rotational force of a corresponding one of the electric motors to a corresponding one of the drive disks, a pair of electric current sensors (33) each configured to detect an electric current flowing through a corresponding one of the electric motors, and a pair of angular velocity sensors (34) each configured to detect an angular velocity of a corresponding one of the electric motors, each of the main wheels comprises a core (31) having a circular annular shape and multiple driven rollers (32) rotatably supported by the core and contacting the pair of drive disks, the control device is configured to set an angular velocity target value of each of the electric motors based on a front-rear velocity target value, a lateral velocity target value, and a yaw angular velocity target value of the vehicle body and feedback-control each of the electric motors such that the angular velocity of each of the electric motors approaches the corresponding angular velocity target value, acquire an actual electric current value of each of the electric motors based on a signal from each of the electric current sensors, calculate, based on the actual electric current value of each electric motor, a component along a reference line (L1) of a driving force of each of the omnidirectional wheels, the reference line connecting ground contact points of the omnidirectional wheels, and determine that there is an abnormality when an absolute value of a difference between the components along the reference line of the driving forces of the omnidirectional wheels is greater than or equal to a predetermined determination value.

According to this aspect, the moving body can detect an abnormality in the transmission mechanisms based on the actual electric current value of each electric motor. Since the left and right omnidirectional wheels provided on the vehicle body cannot move relative to each other, the control device sets the angular velocity target value of each electric motor such that the components along the reference line of the driving forces of the left and right omnidirectional wheels become equal to each other. Therefore, the components along the reference line of the driving forces of the left and right omnidirectional wheels become equal to each other if there is no abnormality in the transmission mechanisms. However, if an abnormality occurs in any of the transmission mechanisms, the load of the corresponding electric motor changes from the normal state, and accordingly, the electric current flowing through this electric motor when the angular velocity of the electric motor matches the angular velocity target value changes from the normal state. As a result, the component along the reference line of the driving force of the omnidirectional wheel calculated from the electric current flowing through this electric motor changes from the normal state. Therefore, by comparing the difference between the components along the reference line of the driving forces of the left and right omnidirectional wheels with the determination value, it is possible to determine whether there is an abnormality in the transmission mechanisms.

In the above aspect, preferably, each of the transmission mechanisms comprises a pulley and a belt.

According to this aspect, the moving body can detect detachment or breakage of the belt.

In the above aspect, preferably, the control device is configured to set an electric current target value of each of the electric motors based on a difference between the angular velocity target value and an actual angular velocity value and to set a voltage to be applied to each of the electric motors based on a difference between the electric current target value and the actual electric current value.

According to this aspect, the moving body can detect an abnormality in the transmission mechanisms based on the actual electric current value of each electric motor.

Another aspect of the present invention provides a moving body (1), comprising: a vehicle body (2); a pair of left and right omnidirectional wheels (3) provided on the vehicle body; and a control device (7) configured to control the pair of omnidirectional wheels, wherein each of the omnidirectional wheels comprises a pair of drive disks (18), an annular main wheel (19) disposed between the drive disks, a pair of electric motors (20) each configured to rotate a corresponding one of the drive disks, a pair of transmission mechanisms (24) each configured to transmit a rotational force of a corresponding one of the electric motors to a corresponding one of the drive disks, a pair of electric current sensors (33) each configured to detect an electric current flowing through a corresponding one of the electric motors, and a pair of angular velocity sensors (34) each configured to detect an angular velocity of a corresponding one of the electric motors, each of the main wheels comprises a core (31) having a circular annular shape and multiple driven rollers (32) rotatably supported by the core and contacting the pair of drive disks, the control device is configured to set an electric current target value of each of the electric motors based on a front-rear velocity target value, a lateral velocity target value, and a yaw angular velocity target value of the vehicle body and feedback-control each of the electric motors such that the electric current of each of the electric motors approaches the corresponding electric current target value, acquire an actual angular velocity value of each of the electric motors based on a signal from each of the angular velocity sensors, calculate, based on the actual angular velocity value of each electric motor, a component along a reference line (L1) of a velocity of each of the omnidirectional wheels, the reference line connecting ground contact points of the omnidirectional wheels, and determine that there is an abnormality when an absolute value of a difference between the components along the reference line of the velocities of the omnidirectional wheels is greater than or equal to a predetermined determination value.

According to this aspect, the moving body can detect an abnormality in the transmission mechanisms based on the actual angular velocity value of each electric motor.

According to the foregoing configuration, it is possible to provide a moving body capable of detecting an abnormality in the transmission mechanisms.

DETAILED DESCRIPTION OF THE INVENTION

In the following, a moving body according to an embodiment of the present invention will be described with reference to the drawings. First, description will be made of the configuration of the moving body. In the present embodiment, the moving body functions as a cart. In the following, the directions are defined with respect to the moving body.

Figure 1:
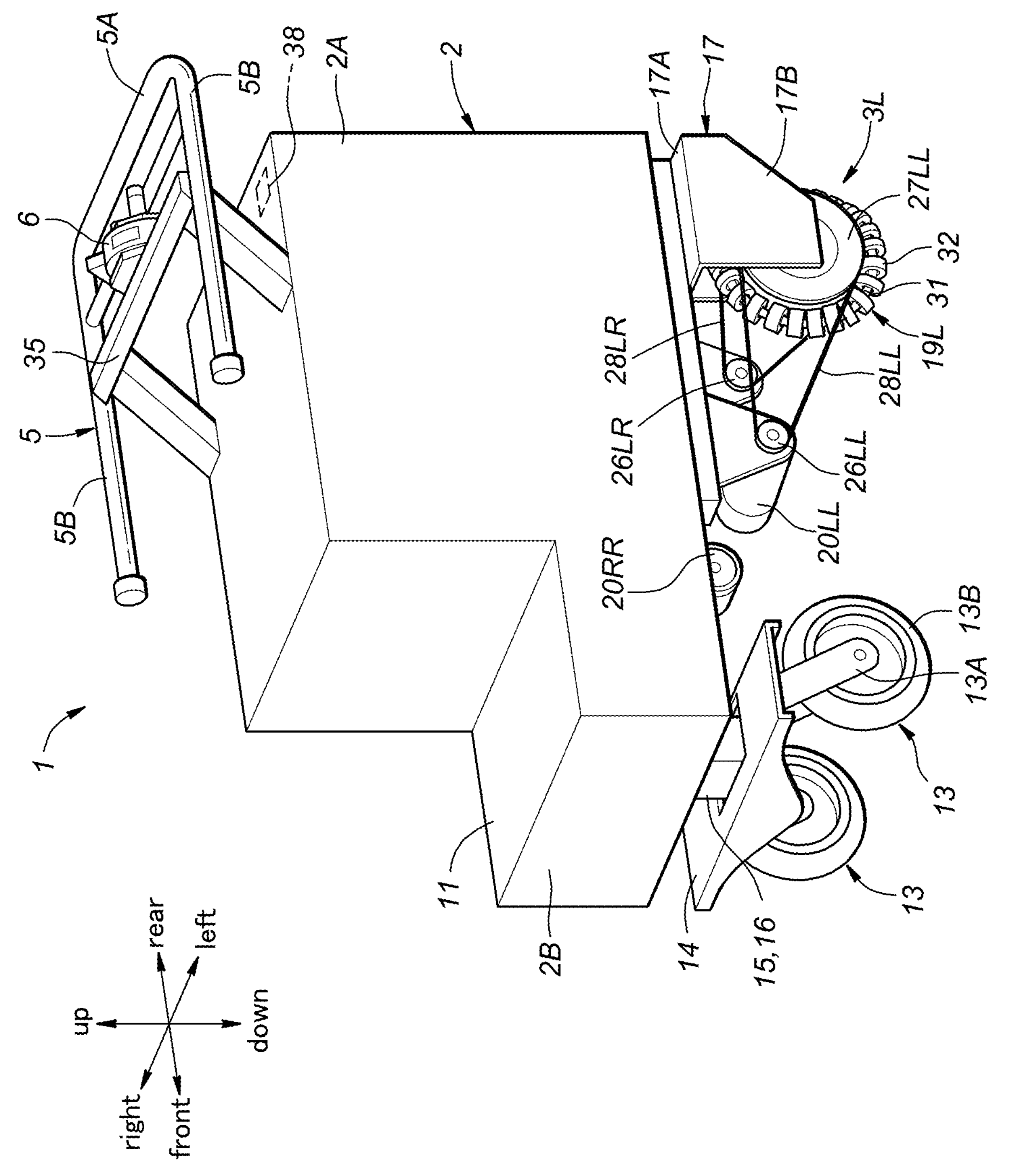
FIG. 1 is a perspective view of a moving body according to an embodiment.

As shown in FIG. 1, a moving body 1 includes a vehicle body 2, a pair of left and right omnidirectional wheels 3 provided on the vehicle body 2 for moving the vehicle body 2 in all directions along the floor surface, a handle 5 provided on the vehicle body 2 for receiving an operation of the user, a force sensor 6 for detecting a load applied to the handle 5, and a control device 7 for controlling each omnidirectional wheel 3 based on the load detected by the force sensor 6.

The vehicle body 2 extends in the front-rear direction. A rear portion 2A of the vehicle body 2 extends upward higher than a front portion 2B. The front portion 2B of the vehicle body 2 is provided with a support base 11 for supporting another device. The device supported on the support base 11 may include inspection equipment such as an X-ray scanner, for example. The device is preferably fastened to the support base 11. Inside the rear portion 2A of the vehicle body 2, the control device 7 is provided together with a battery and various sensors.

In the present embodiment, the pair of omnidirectional wheels 3 is provided under the rear portion 2A of the vehicle body 2. Also, left and right casters 13 are supported under the front portion 2B of the vehicle body 2 via a suspension. The suspension includes an arm 14 disposed below the vehicle body 2 and extending laterally, and a spring 15 and a shock absorber 16 disposed between the vehicle body 2 and the arm 14. The casters 13 are disposed below the left end and the right end of the arm 14. Each caster 13 includes a fork 13A joined to the arm 14 to be rotatable about an axis extending vertically, and a wheel 13B supported by the fork 13A to be rotatable about an axis extending in the horizontal direction. The fork 13A rotates freely relative to the arm 14, and the wheel 13B rotates freely relative to the fork 13A.

Figure 2:
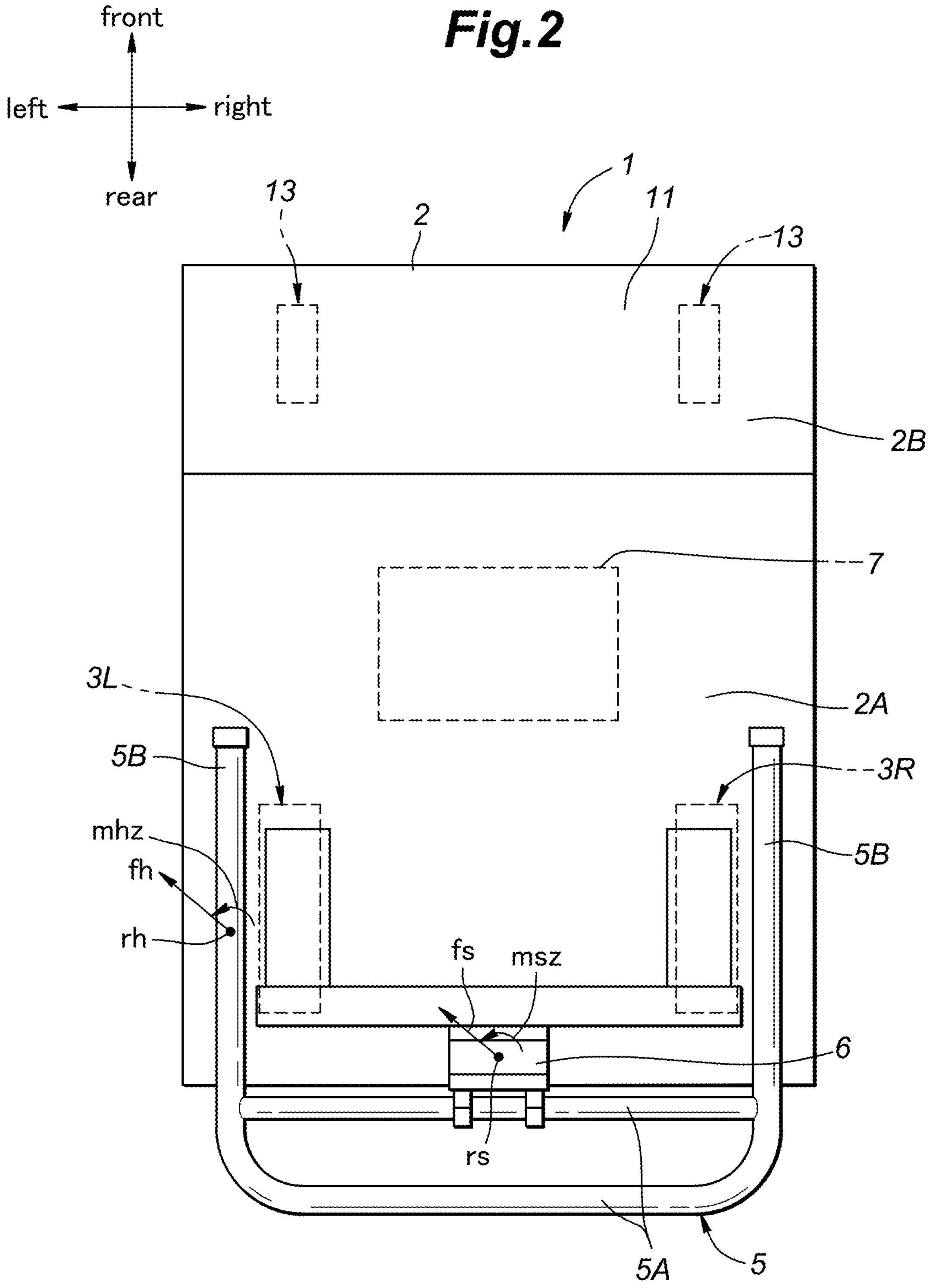
FIG. 2 is a plan view of the moving body.
Figure 3:
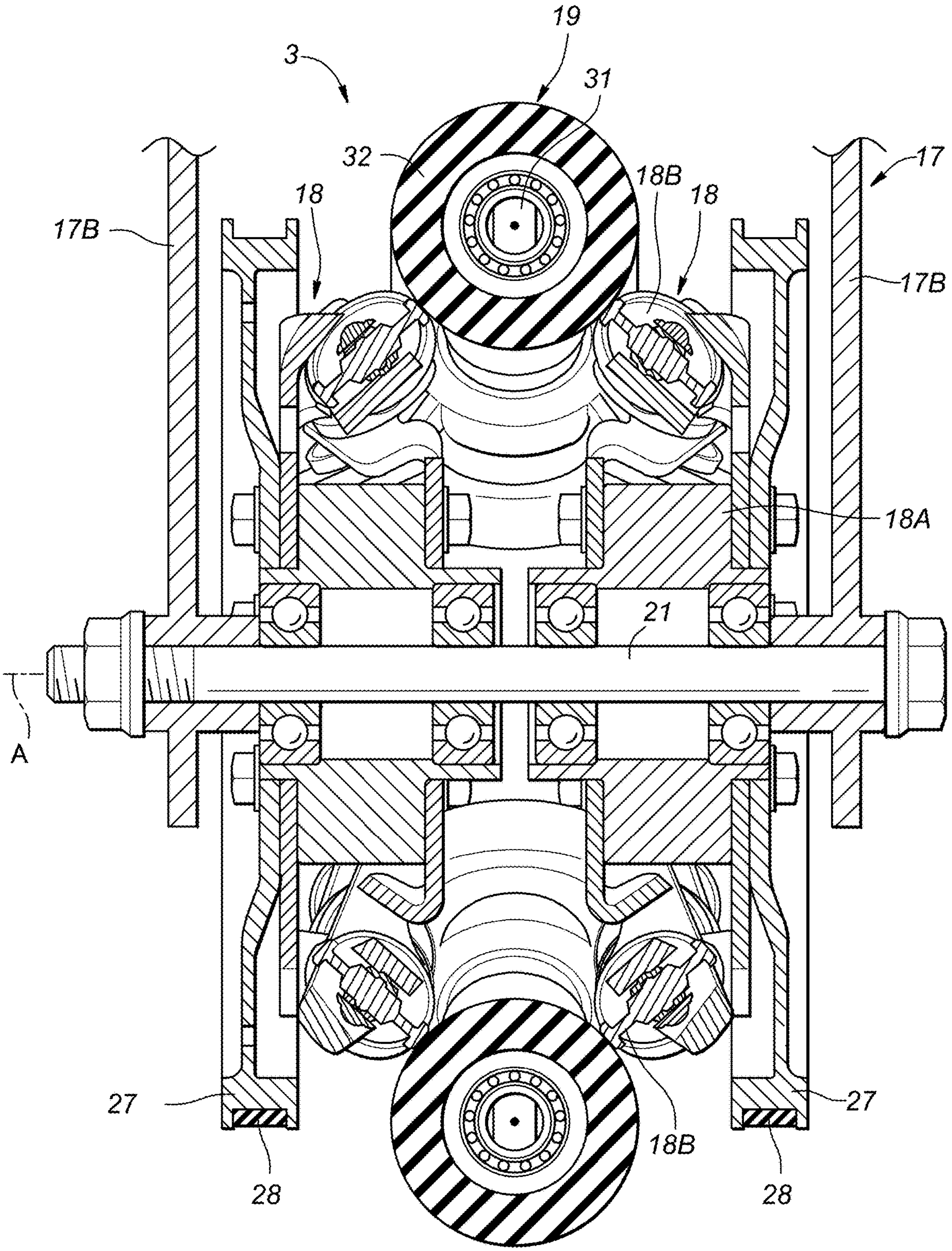
FIG. 3 is a sectional view of an omnidirectional wheel.

As shown in FIG. 2, the left and right omnidirectional wheels 3 are disposed to be laterally spaced from each other. The position and direction of each omnidirectional wheel 3 are fixed relative to the vehicle body 2. In the present embodiment, the two omnidirectional wheels 3 are disposed under the left and right parts of the rear portion 2A of the vehicle body 2. As shown in FIG. 3, each omnidirectional wheel 3 includes a frame 17, a pair of drive disks 18 rotatably supported by the frame 17, an annular main wheel 19 disposed between the drive disks 18, and a pair of electric motors 20 for rotating the respective drive disks 18.

As shown in FIGS. 1 and 3, the frame 17 includes a frame upper portion 17A joined to the lower portion of the vehicle body 2, and a pair of frame side portions 17B respectively extending downward from the left and right ends of the frame upper portion 17A. A support shaft 21 extends laterally between the lower ends of the frame side portions 17B. Each of the drive disks 18 is rotatably supported on the support shaft 21. The pair of drive disks 18 and the support shaft 21 are disposed coaxially. The axis of the pair of drive disks 18 constitutes the rotation axis A of the omnidirectional wheel 3. The position of each drive disk 18 in the left-right direction is restricted with respect to the support shaft 21. The drive disks 18 are laterally spaced from each other and oppose each other.

The drive disks 18 are disposed on both sides of the annular main wheel 19 and apply frictional force to the main wheel 19 to rotate the main wheel 19 about a central axis and an annular axis. Each drive disk 18 includes a disk-shaped base 18A rotatably supported by the frame 17 and multiple drive rollers 18B rotatably supported on the outer periphery of the base 18A while being inclined with respect to each other and in contact with the main wheel 19. The base 18A is disposed coaxially with the support shaft 21.

The drive disks 18 which oppose each other are formed in a bilaterally symmetrical shape. Namely, the position and direction of the multiple drive rollers 18B of the left drive disk 18 and the position and direction of the multiple drive rollers 18B of the right drive disk 18 are bilaterally symmetrical.

Figure 5:
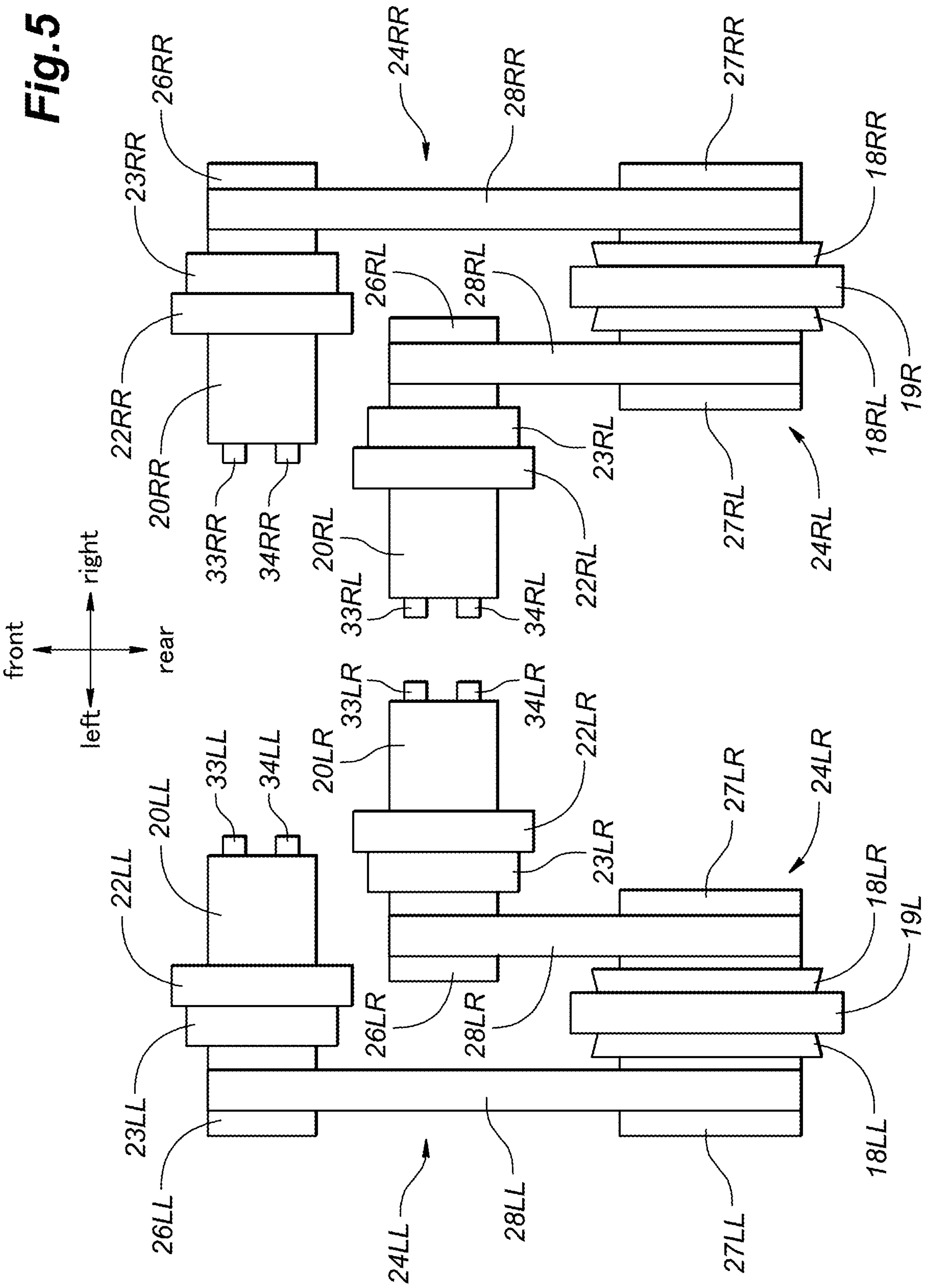
FIG. 5 is an explanatory diagram of left and right omnidirectional wheels.

As shown in FIG. 5, each drive disk 18 is connected to a corresponding electric motor 20 via an electromagnetic brake 22, a speed reducer 23, and a transmission mechanism 24. The transmission mechanism 24 transmits the rotational force of the electric motor 20 to the corresponding drive disk 18. Each transmission mechanism 24 includes a drive pulley 26 joined to the output shaft of the corresponding speed reducer 23, a driven pulley 27 joined to the corresponding drive disk 18, and a belt 28 wound between the drive pulley 26 and the driven pulley 27. The driven pulley 27 is provided coaxially with the drive disk 18. The pair of electric motors 20 are provided under the vehicle body 2. With the electric motors 20 rotating independently from each other, the drive disks 18 rotate independently from each other.

Figure 4:
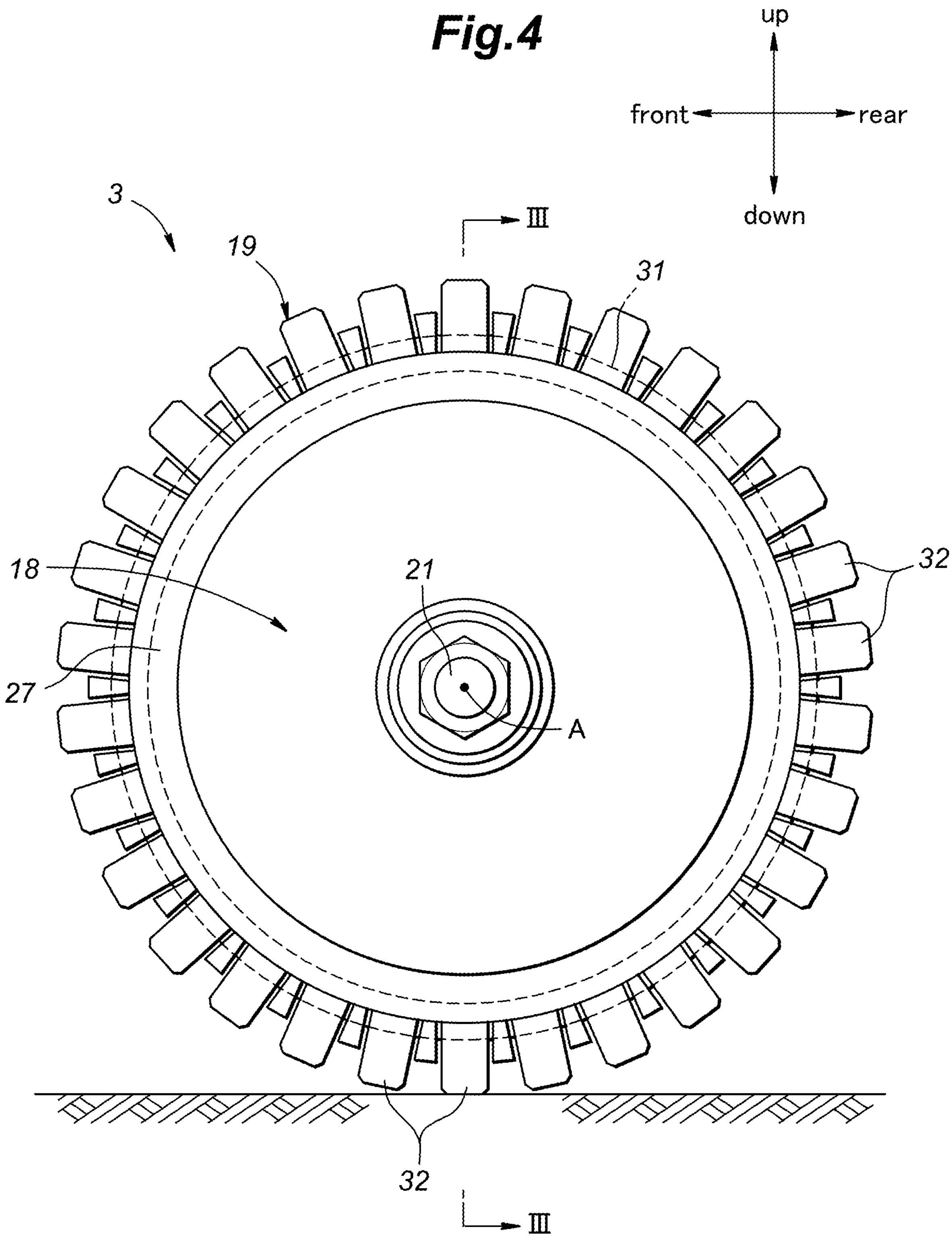
FIG. 4 is a side view of a main wheel.

As shown in FIG. 4, the main wheel 19 has an annular shape, is disposed between the drive disks 18 to be coaxial with the drive disks 18, is in contact with the multiple drive rollers 18B, and is rotatable about the central axis and the annular axis. The main wheel 19 includes an annular core 31 and multiple driven rollers 32 rotatably supported by the core 31. The multiple driven rollers 32 are arranged at equal intervals in the circumferential direction of the core 31. Each driven roller 32 is supported by the core 31 to be rotatable about an axis (annular axis) of the annular core 31. Each driven roller 32 can rotate about a tangent line on the core 31 at its respective position relative to the core 31. Each driven roller 32 rotates with respect to the core 31 upon receiving an external force.

The main wheel 19 is disposed along the outer periphery of the pair of drive disks 18 and is in contact with the multiple drive rollers 18B provided on each drive disk 18. The drive rollers 18B of the left and right drive disks 18 contact the inner periphery of the main wheel 19 and sandwich the main wheel 19 from left and right sides. Further, the drive rollers 18B of the left and right drive disks 18 restrict the radial displacement of the main wheel 19 about the rotation axis A by contacting the inner periphery of the main wheel 19. In this way, the main wheel 19 is supported by the left and right drive disks 18, and the central axis of the main wheel 19 (core 31) is disposed coaxially with the rotation axis A. The main wheel 19 contacts the multiple drive rollers 18B of the left and right drive disks 18 at the multiple driven rollers 32.

The main wheel 19 contacts the ground under the rotation axis A. Namely, in plan view, the ground contact point of the omnidirectional wheel 3 is positioned on the rotation axis A. The main wheel 19 is disposed on a plane perpendicular to the rotation axis A.

As shown in FIG. 5, the left and right omnidirectional wheels 3 have the same configuration. The left omnidirectional wheel 3 may be denoted by a reference numeral with a suffix L, namely, 3L. Also, the right omnidirectional wheel 3 may be denoted by a reference numeral with a suffix R, namely, 3R. Also, in the left omnidirectional wheel 3L, the left element of a pair of left and right elements is denoted by a reference numeral with a suffix LL, and the right element of the pair is denoted by a reference numeral with a suffix LR. Similarly, in the right omnidirectional wheel 3R, the left element of a pair of left and right elements is denoted by a reference numeral with a suffix RL, and the right element of the pair is denoted by a reference numeral with a suffix RR. For example, as shown in FIG. 5, the left omnidirectional wheel 3L includes the left electric motor 20LL, the right electric motor 20LR, the left transmission mechanism 24LL, the right transmission mechanism 24LR, the left drive disk 18LL, the right drive disk 18LR, and the main wheel 19L. Similarly, the right omnidirectional wheel 3R includes the left electric motor 20RL, the right electric motor 20RR, the left transmission mechanism 24RL, the right transmission mechanism 24RR, the left drive disk 18RL, the right drive disk 18RR, and the main wheel 19R.

The left drive disk 18LL of the left omnidirectional wheel 3L and the left drive disk 18RL of the right omnidirectional wheel 3R have the same shape. The right drive disk 18LR of the left omnidirectional wheel 3L and the right drive disk 18RR of the right omnidirectional wheel 3R have the same shape.

Each electric motor 20 is provided with an electric current sensor 33 (33LL, 33LR, 33RL, 33RR) for detecting the electric current flowing through the electric motor 20. Each electric motor 20 is provided with an angular velocity sensor 34 (34LL, 34LR, 34RL, 34RR) for detecting the angular velocity of the electric motor 20.

Figure 11:
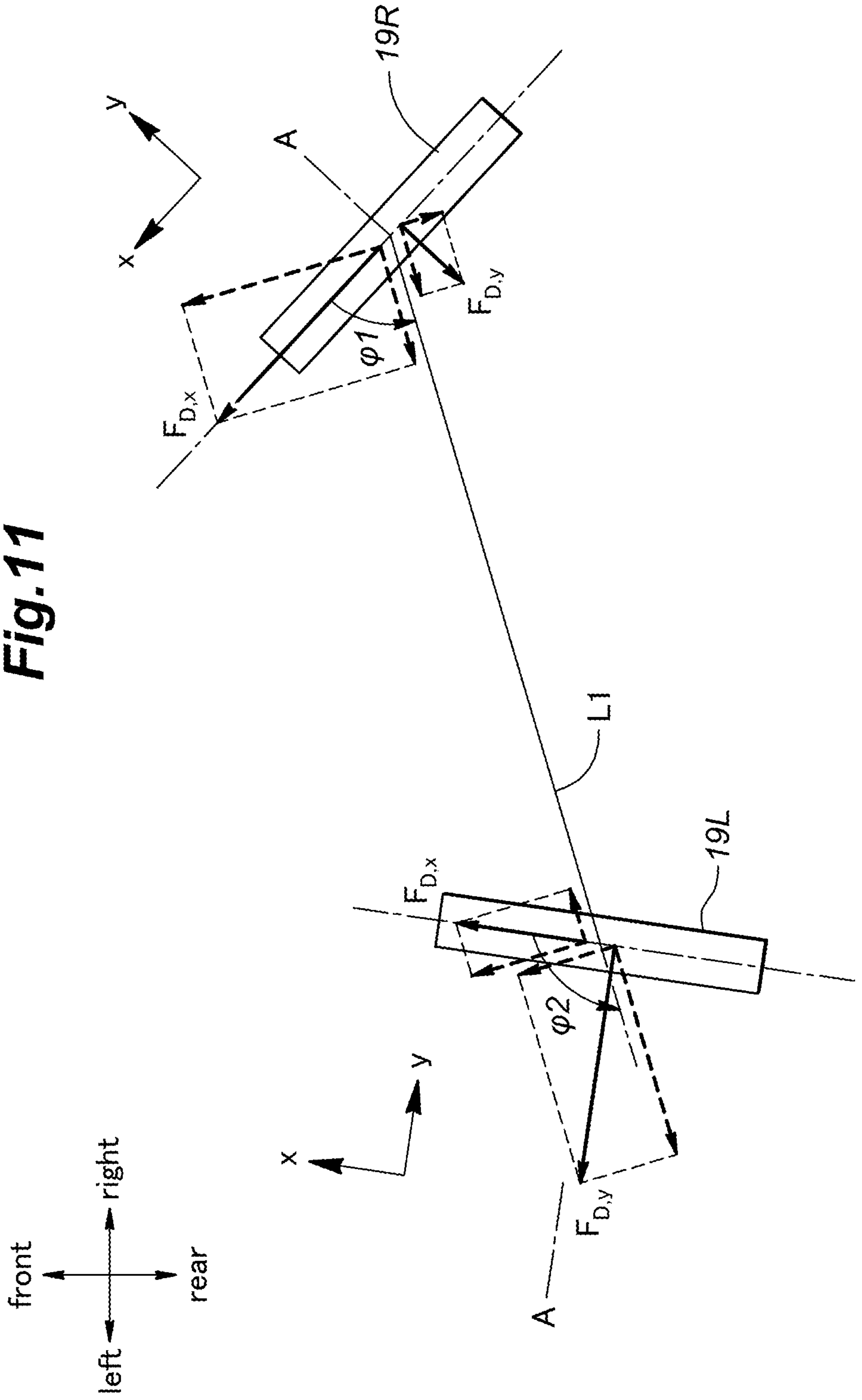
FIG. 11 is an explanatory diagram showing the positional relationship between the left and right omnidirectional wheels.

As shown in FIG. 11, a straight line connecting the respective ground contact points of the omnidirectional wheels 3L, 3R is referred to as a reference line L1. In general, the left and right main wheels 19L, 19R may be inclined with respect to the reference line L1 as seen in plan view. Also, the rotation axes A, A of the left and right omnidirectional wheels 3L, 3R may be inclined with respect to the reference line L1 as seen in plan view. In the present embodiment, the reference line L1 extends in the left-right direction as seen in plan view, and each of the left and right main wheels 19L, 19R forms a 90 degree angle with the reference line L1. Also, each of the rotation axes A, A of the left and right omnidirectional wheels 3L, 3R coincides with the reference line L1 as seen in plan view.

In each omnidirectional wheel 3, when the two drive disks 18 rotate in the same direction at the same rotation speed, the main wheel 19 rotates together with the two drive disks 18. That is, the main wheel 19 rotates forward or backward about its own axis which coincides with the rotation axis A. At this time, the drive rollers 18B of each drive disk 18 and the driven rollers 32 of the main wheel 19 do not rotate with respect to the core 31. In each omnidirectional wheel 3, when a rotation speed difference occurs between the two drive disks 18, a force component perpendicular to the force in the circumferential (tangential) direction caused by the rotation of the two drive disks 18 acts on the driven rollers 32 of the main wheel 19 from the left and right drive rollers 18B. Such a force component is generated due to the rotation speed difference between the drive disks 18 because the axis of each drive roller 18B is inclined with respect to the circumferential direction of the associated drive disk 18. This force component causes the drive rollers 18B to rotate relative to the base 18A and the driven rollers 32 to rotate relative to the core 31. In this way, the main wheel 19 generates a driving force in the left-right direction.

Figure 6:
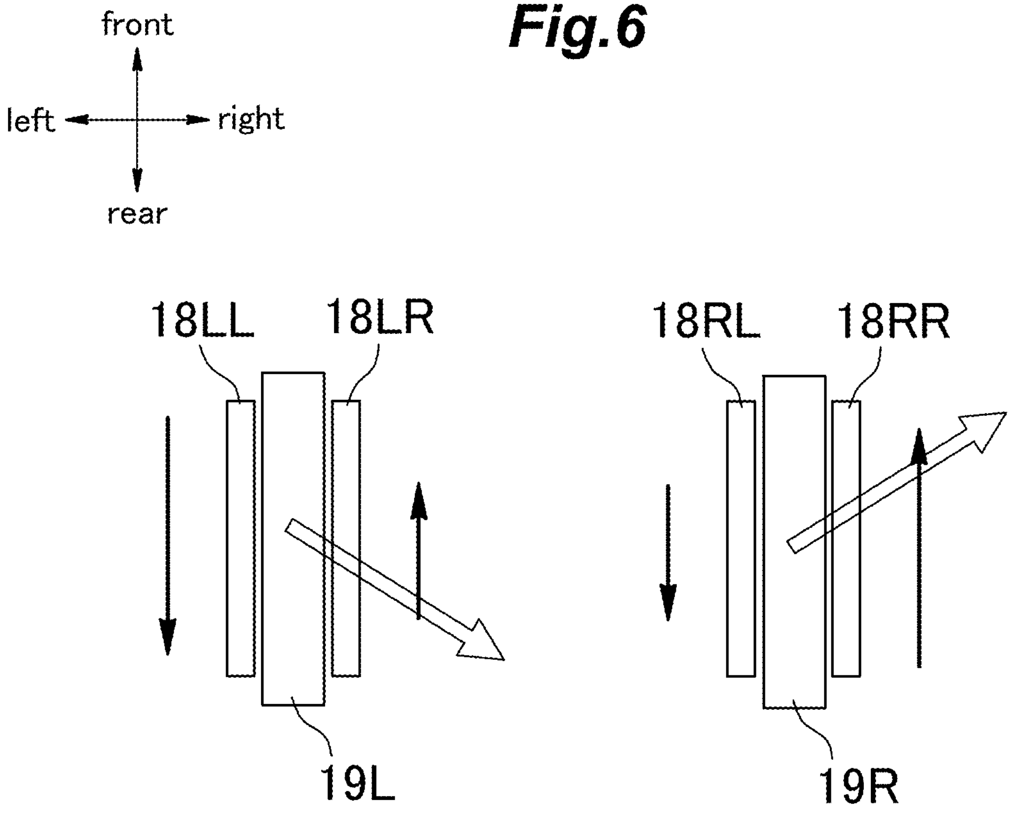
FIG. 6 is an explanatory diagram showing a relationship between driving force and rotation of each drive disk.

As shown in FIG. 6, in each omnidirectional wheel 3, when the right drive disk 18 rotates forward and the left drive disk 18 rotates backward (in reverse), the driven rollers 32 contacting the ground rotate rightward, and a rightward driving force component occurs. Black arrows represent the rotation direction and the magnitude of angular velocity of the respective drive disks 18. White arrows represent the direction and magnitude of the driving force generated by the respective omnidirectional wheels 3. Here, when the drive disk 18 is seen from the right, the forward rotation is a clockwise rotation and the backward rotation is a counterclockwise rotation. At this time, if the angular velocity (rotation speed) of the right drive disk 18 is less than the angular velocity of the left drive disk 18, the main wheel 19 rotates backward, and a backward driving force component occurs. On the other hand, if the angular velocity of the right drive disk 18 is greater than the angular velocity of the left drive disk 18, the main wheel 19 rotates forward, and a forward driving force component occurs.

In each omnidirectional wheel 3, When the right drive disk 18 rotates backward and the left drive disk 18 rotates forward, driven rollers 32 contacting the ground rotate leftward, and a leftward driving force component occurs. At this time, if the angular velocity (rotation speed) of the right drive disk 18 is less than the angular velocity of the left drive disk 18, the main wheel 19 rotates forward, and a forward driving force component occurs. On the other hand, if the angular velocity of the right drive disk 18 is greater than the angular velocity of the left drive disk 18, the main wheel 19 rotates backward, and a backward driving force component occurs.

As shown in FIG. 6, when the right drive disk 18LR of the left omnidirectional wheel 3L rotates forward and the left drive disk 18LL of the same rotates backward at an angular velocity greater than that of the drive disk 18LR and the right drive disk 18RR of the right omnidirectional wheel 3R rotates forward and the left drive disk 18RL of the same rotates backward at an angular velocity less than that of the drive disk 18RR, the moving body 1 turns left while drifting rightward.

When the left and right omnidirectional wheels 3 rotate forward at the same speed, the moving body 1 moves forward. When the left and right omnidirectional wheels 3 rotate backward at the same speed, the moving body 1 moves backward. When a speed difference occurs between the rotations of the left and right omnidirectional wheels 3 in the front-rear direction, the moving body 1 turns right or left. With rotation of the driven rollers 32 of the main wheel 19 of each of the left and right omnidirectional wheels 3, the moving body 1 can undergo a translational movement rightward or leftward.

As shown in FIGS. 1 and 2, a handle holder 35 protruding upward is provided on an upper portion of the rear portion 2A of the vehicle body 2. The handle 5 is supported by the handle holder 35 via the force sensor 6. The force sensor 6 may consist of a three-axis load sensor configured to detect loads along two axes that are perpendicular to each other on a horizontal plane and a moment around the vertical axis (z-axis). In the present embodiment, the force sensor 6 is configured to detect a front-rear load, a lateral load, and the moment around the vertical axis applied to the handle 5. The front-rear load is a load in the front-rear direction (x-axis direction). The lateral load is a load in the lateral direction (y-axis direction). The force sensor 6 includes a main body portion and an input portion provided in the main body portion. The main body portion is coupled to the handle holder 35.

The handle 5 includes a lateral portion 5A extending in the lateral direction and a pair of forward extending portions 5B extending forward from respective lateral ends of the lateral portion 5A. The laterally central portion of the lateral portion 5A is coupled to the input portion of the force sensor 6.

As shown in FIG. 2, when the user applies an external force fh and a moment mhz to a position rh of the handle 5, the force sensor 6 detects a detected force fs (detected load) and a detected moment msz at a sensor position rs. The detected force fs includes a front-rear load fs1 as a component in the front-rear direction and a lateral load fs2 as a component in the lateral direction.

The control device 7 is an electronic control unit (ECU) including a processor such as a CPU, a non-volatile memory such as a ROM, a volatile memory such as a RAM, and so on. The control device 7 controls each omnidirectional wheel 3 by executing, with the processor, computational processing according to the program stored in the non-volatile memory. The control device 7 may be configured as one piece of hardware or may be configured as a unit including multiple pieces of hardware. Also, at least a part of the functional units of the control device 7 may be realized as hardware such as an LSI, an ASIC, and an FPGA, or may be realized as a combination of software and hardware.

The control device 7 is connected to the force sensor 6, the electric motors 20, the electric current sensors 33, and the angular velocity sensors 34. The force sensor 6, the electric current sensors 33, and the angular velocity sensors 34 output detection signals to the control device 7. The control device 7 outputs a control signal to each electric motor 20.

The control device 7 controls each electric motor 20 of each omnidirectional wheel 3 based on the signals from the force sensor 6, the electric current sensors 33, and the angular velocity sensors 34. The force sensor 6 detects the magnitude and direction of an operating force (load) applied by the user to the handle 5. The control device 7 determines the front-rear velocity target value, the lateral velocity target value, and the yaw angular velocity target value of the moving body 1 based on the signal from the force sensor 6, and sets the angular velocity target value (rotation speed target value) for each of the two electric motors 20 of each omnidirectional wheel 3 based on the front-rear velocity target value, the lateral velocity target value, and the yaw angular velocity target value. Preferably, the control device 7 sets the angular velocity target value of each electric motor 20 based on the front-rear velocity target value, the lateral velocity target value, and the yaw angular velocity target value by using a map which defines the relationship of the angular velocity target value of each electric motor 20 with the front-rear velocity target value, the lateral velocity target value, and the yaw angular velocity target value.

When setting the angular velocity target value of each of the two electric motors 20 of each omnidirectional wheel 3 based on the front-rear velocity target value, the lateral velocity target value, and the yaw angular velocity target value, the control device 7 sets the angular velocity target value of each electric motor 20 such that the lateral components of the driving forces generated by the left and right omnidirectional wheels 3L, 3R become equal to each other. This is because the left and right omnidirectional wheels 3L, 3R cannot move relative to each other in the left-right direction. Note that in the case where the directions of the left and right omnidirectional wheels 3L, 3R are inclined with respect to the reference line L1, the control device 7 sets the angular velocity target value of each electric motor 20 such that the components along the reference line L1 of the driving forces generated by the left and right omnidirectional wheels 3L, 3R become equal to each other.

Figure 7:
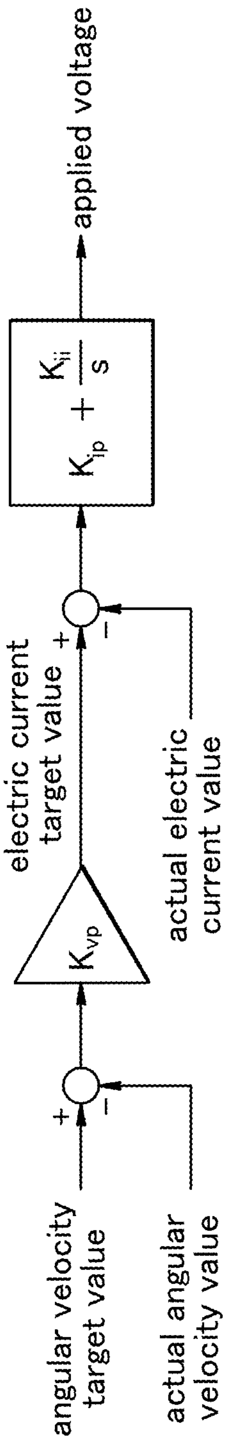
FIG. 7 is an explanatory diagram showing a control block for each electric motor of a control device according to the first embodiment.

FIG. 7 shows one example of a control block of the control device 7 corresponding to each electric motor 20. The control device 7 sets an electric current target value for each electric motor 20 by multiplying the difference between the angular velocity target value and the actual angular velocity value detected by the angular velocity sensor 34 by a gain Kvp. Then, the control device 7 preferably sets the voltage applied to each electric motor 20 by PI control based on the difference between the electric current target value and the actual electric current value detected by the electric current sensor 33. The control device 7 sets the applied voltage of each electric motor 20 independently and applies the set applied voltage to the corresponding electric motor 20. Thereby, each electric motor 20 rotates with the angular velocity target value.

The vehicle body 2 is provided with a notification device 38. The notification device 38 includes at least one of an indicator, a display, a warning lamp, and a speaker.

Behavior when Abnormality Occurs in Transmission Mechanisms

Figure 8:
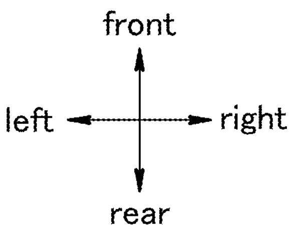
FIG. 8 is an explanatory diagram showing a relationship between driving force and rotation of each drive disk when the right belt of the left omnidirectional wheel is detached or broken.
Figure 8:
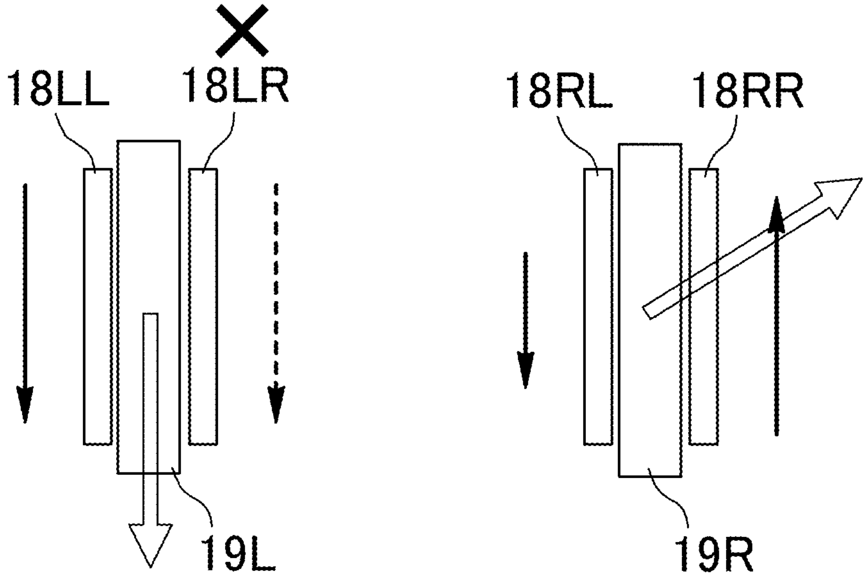

FIG. 8 is an explanatory diagram showing a relationship between driving force and rotation of each drive disk 18 when the right belt 28LR of the left omnidirectional wheel 3L is detached or broken. In FIG. 8, rotation of the drive disks 18LL, 18RL, and 18RR is the same as in FIG. 6, but rotation of the drive disk 18LR differs from that in FIG. 6 due to detachment or breakage of the belt 28LR. Black arrows represent the rotational direction and the magnitude of angular velocity of the respective drive disks 18. White arrows represent the direction and magnitude of the driving force generated by the respective omnidirectional wheels 3. When the right belt 28LR of the left omnidirectional wheel 3L is detached or broken, the rotational force of the electric motor 20LR is not transmitted to the drive disk 18LR. In this case, the drive disk 18LR rotates integrally with the main wheel 19 due to friction force. Accordingly, the drive disk 18LR rotates in the same direction and with the same angular velocity as the drive disk 18LL. Therefore, the direction of the driving force generated by the left omnidirectional wheel 3L differs from that shown in FIG. 6. However, since the moving body 1 turns left as in FIG. 6, it is difficult for the user to recognize the abnormality of the belt 28LR.

Figure 9:
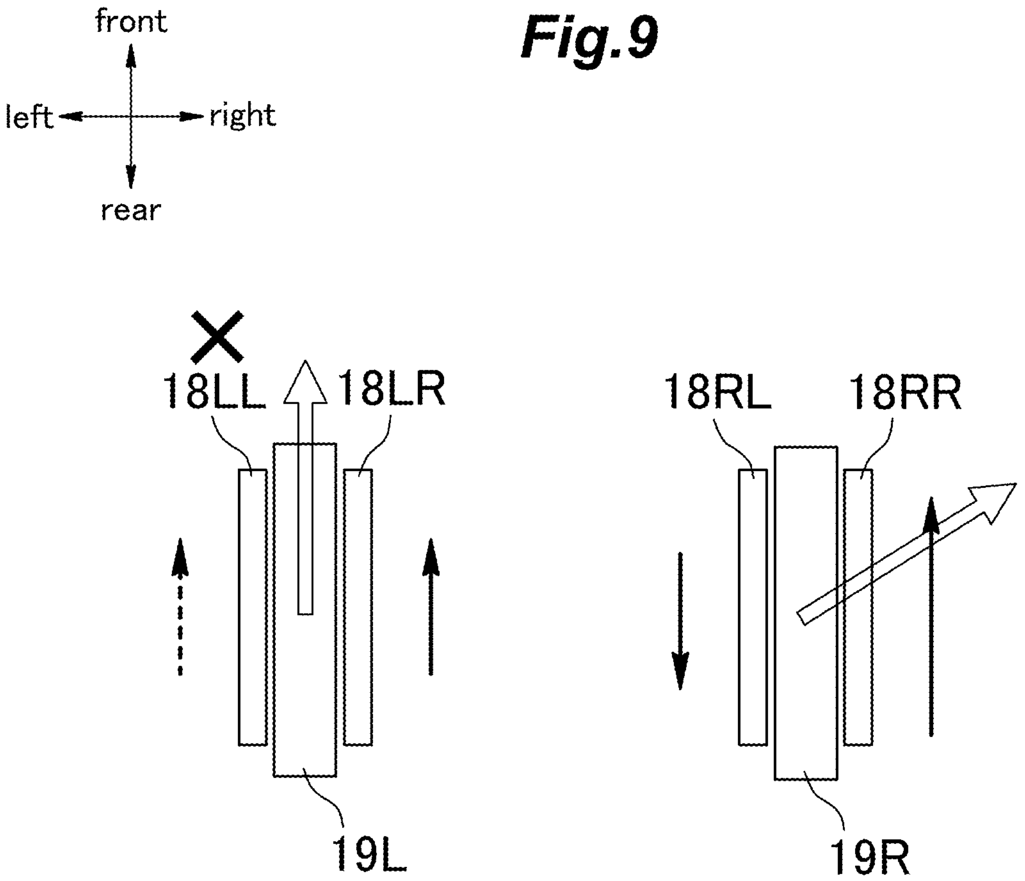
FIG. 9 is an explanatory diagram showing a relationship between driving force and rotation of each drive disk when the left belt of the left omnidirectional wheel is detached or broken.

FIG. 9 is an explanatory diagram showing a relationship between driving force and rotation of each drive disk 18 when the left belt 28LL of the left omnidirectional wheel 3L is detached or broken. In FIG. 9, rotation of the drive disks 18LR, 18RL, and 18RR is the same as in FIG. 6, but rotation of the drive disk 18LL differs from that in FIG. 6 due to detachment or breakage of the belt 28LL. Black arrows represent the rotational direction and the magnitude of angular velocity of the respective drive disks 18. White arrows represent the direction and magnitude of the driving force generated by the respective omnidirectional wheels 3. When the left belt 28LL of the left omnidirectional wheel 3L is detached or broken, the rotational force of the electric motor 20LL is not transmitted to the drive disk 18LL. In this case, the drive disk 18LL rotates integrally with the main wheel 19 due to friction force. Accordingly, the drive disk 18LL rotates in the same direction and with the same angular velocity as the drive disk 18LR. Therefore, the direction of the driving force generated by the left omnidirectional wheel 3L differs from that shown in FIG. 6. In this case, since the left omnidirectional wheel 3L generates a forward driving force, the moving body 1 turns right. As a result, the behavior of the moving body 1 significantly changes from the state shown in FIG. 6.

Method for Detecting Abnormality of Transmission Mechanism 24

Figure 10:
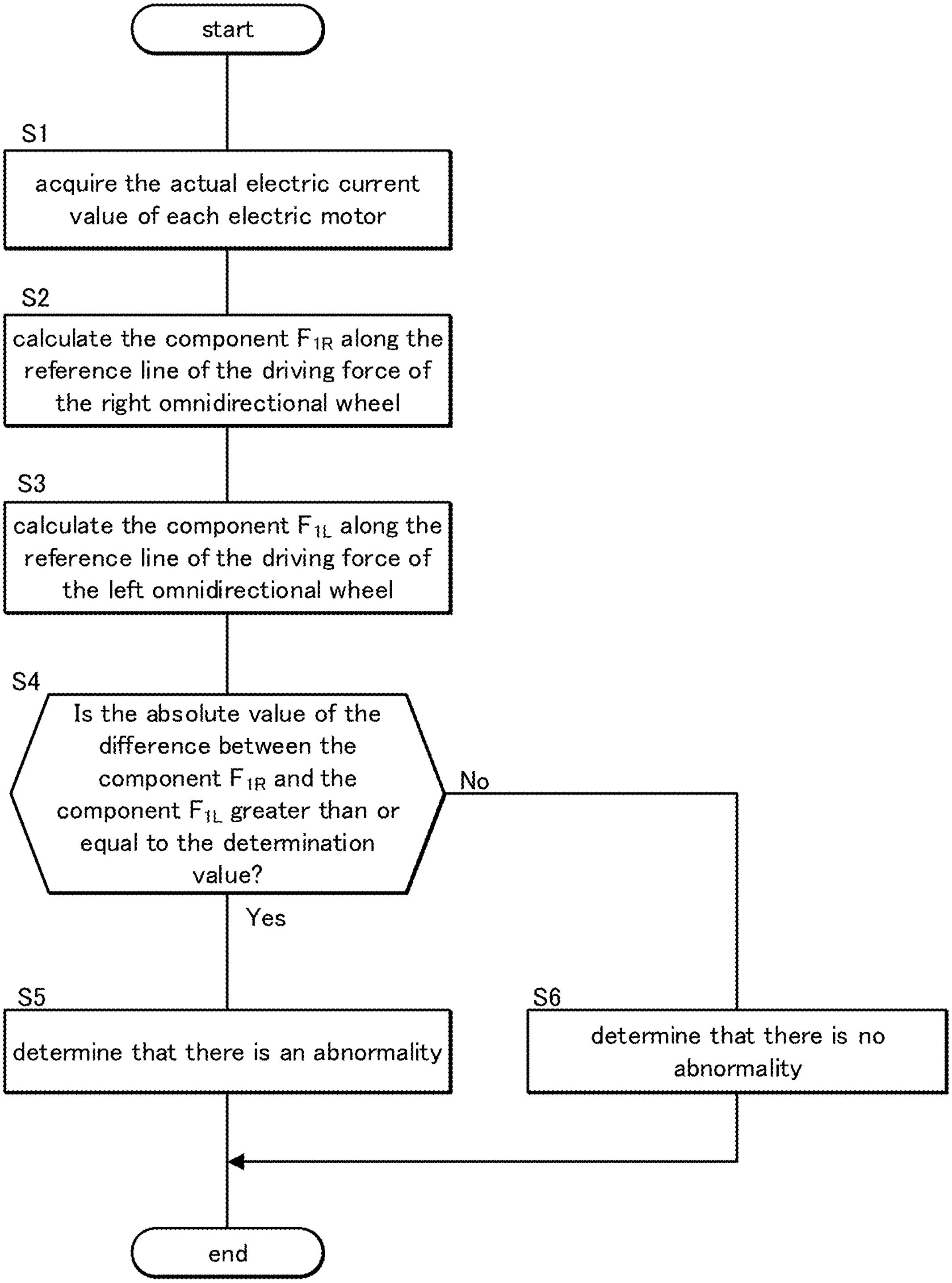
FIG. 10 is a flowchart of a process executed by the control device according to the first embodiment to detect an abnormality in the transmission mechanisms.

FIG. 10 is a flowchart of a process executed by the control device 7 to detect an abnormality in the transmission mechanisms 24. The control device 7 executes the abnormality detection process shown in FIG. 10 at a predetermined time interval. The control device 7 first acquires the actual electric current value of each electric motor 20 based on the signal from each electric current sensor 33 (S1).

Subsequently, the control device 7 calculates the component $F_{1R}$ along the reference line L1 of the driving force of the right omnidirectional wheel 3R based on the actual electric current value of each of the electric motors 20RL, 20RR of the right omnidirectional wheel 3R (S2). Further, the control device 7 calculates the component $F_{1L}$ along the reference line L1 of the driving force of the left omnidirectional wheel 3L based on the actual electric current value of each of the electric motors 20LL, 20LR of the left omnidirectional wheel 3L (S3).

In the following, one example of a method for calculating the component along the reference line L1 of the driving force of each omnidirectional wheel 3 from the actual electric current values of the two electric motors 20 of the omnidirectional wheel 3 will be described. Here, as seen in plan view, the direction perpendicular to the rotation axis A of each omnidirectional wheel 3 is referred to as the x direction, and the direction along the rotation axis A is referred to as the y direction. The x-direction component $F_{D,x}$ of the driving force $F_D$ of each omnidirectional wheel 3 can be calculated based on the sum of the actual electric current values of the two electric motors 20 and the speed ratio from each electric motor 20 to the main wheel 19. The y-direction component $F_{D,y}$ of the driving force $F_D$ of each omnidirectional wheel 3 can be calculated based on the difference between the actual electric current values of the two electric motors 20 and the speed ratio from each electric motor 20 to the main wheel 19. For example, the x-direction component $F_{D,x}$ and the y-direction component $F_{D,y}$ of the driving force $F_D$ of each omnidirectional wheel 3 can be calculated from the actual electric current values of the two electric motors 20 according to the following formulas (1) to (3).

$$\begin{cases} T_{H,L} = -A_L S_L K_t G_1 \\ T_{H,R} = -A_R S_R K_t G_1 \end{cases} \tag{1}$$

$$\begin{cases} T_{D,x} = T_{H,L} + T_{H,R} = -(A_L S_L + A_R S_R) K_t G_1 \\ T_{D,y} = (T_{H,L} - T_{H,R}) G_2 = -(A_L S_L - A_R S_R) K_t G_1 G_2 \end{cases} \tag{2}$$

-continued $$\begin{cases} F_{D,x} = \dfrac{T_{D,x}}{R_x} = -\dfrac{K_t G_1}{R_x}(A_L S_L + A_R S_R) \\ F_{D,y} = \dfrac{T_{D,y}}{R_y} = -\dfrac{K_t G_1 G_2}{R_y}(A_L S_L - A_R S_R) \end{cases} \tag{3}$$

wherein $T_{H,L}$ is a torque [Nm] of the left drive disk 18 of the omnidirectional wheel 3, $T_{H,R}$ is a torque [Nm] of the right drive disk 18 of the omnidirectional wheel 3, $A_L$ is an actual electric current value [A] of the left electric motor 20 of the omnidirectional wheel 3, $A_R$ is an actual electric current value [A] of the right electric motor 20 of the omnidirectional wheel 3, $S_L$ is a sign indicating the direction of the left electric motor 20 of the omnidirectional wheel 3 (−1 when the rotation shaft extends in the positive y direction and +1 when the rotation shaft extends in the negative y direction), $S_R$ is a sign indicating the direction of the right electric motor 20 of the omnidirectional wheel 3 (−1 when the rotation shaft extends in the positive y direction and +1 when the rotation shaft extends in the negative y direction), $K_t$ is a torque constant [Nm/A] of the left and right electric motors 20, $G_1$ is a speed ratio provided by the speed reducer and the transmission mechanism (a speed ratio of the drive disk 18 to the electric motor 20), $G_2$ is a speed ratio of the driven roller 32 to the drive disk 18, $T_{D,x}$ is an x-direction torque [Nm] of the omnidirectional wheel 3, $T_{D,y}$ is a y-direction torque [Nm] of the omnidirectional wheel 3, Rx is a distance [m] from the rotation axis A of the drive disk 18 to the floor surface (large-diameter wheel radius), and $R_y$ is a radius [m] of the driven roller 32 (small-diameter wheel radius).

Preferably, $G_2$ is a coefficient preset based on test results.

As shown in FIG. 11, as seen in plan view, an angle defined between the x direction of the right omnidirectional wheel 3R and the reference line L1 is denoted by φ1 [rad], and an angle defined between the x direction of the left omnidirectional wheel 3L and the reference line L1 is denoted by φ2 [rad]. Then, the component $F_{1R}$ along the reference line L1 of the driving force of the right omnidirectional wheel 3R is represented by the following formula (4).

$$F_{1R} = F_{D,x}\cos\varphi 1 + F_{D,y}\sin\varphi 1 \tag{4}$$

Also, the component $F_{1L}$ along the reference line L1 of the driving force of the left omnidirectional wheel 3L is represented by the following formula (5).

$$F_{1L} = F_{D,x}\cos\varphi 2 + F_{D,y}\sin\varphi 2 \tag{5}$$

When φ1=π/2, the component $F_{1R}$ along the reference line L1 of the driving force of the right omnidirectional wheel 3R becomes equal to the y-direction component of the driving force. Similarly, when φ2=π/2, the component $F_{1L}$ along the reference line L1 of the driving force of the left omnidirectional wheel 3L becomes equal to the y-direction component of the driving force.

Next, the control device 7 determines whether the absolute value of the difference between the component $F_{1R}$ along the reference line L1 of the driving force of the right omnidirectional wheel 3 and the component $F_{1L}$ along the reference line L1 of the driving force of the left omnidirectional wheel 3 is greater than or equal to a predetermined determination value (S4). The determination value is preferably set to 500 to 1200 N, for example.

When the absolute value of the difference between the component $F_{1R}$ along the reference line L1 of the driving force of the right omnidirectional wheel 3 and the component $F_{1L}$ along the reference line L1 of the driving force of the left omnidirectional wheel 3 is greater than or equal to the determination value (the determination result in S4 is Yes), the control device 7 determines that there is an abnormality in the transmission mechanisms 24 (S5). In the case where the control device 7 determines that there is an abnormality in the transmission mechanisms 24, the control device 7 preferably gives a notification to the user by controlling the notification device 38, for example. Also, the control device 7 may prohibit driving of each electric motor 20 or may reduce the driving amount of each electric motor 20.

When the absolute value of the difference between the component $F_{1R}$ along the reference line L1 of the driving force of the right omnidirectional wheel 3 and the component $F_{1L}$ along the reference line L1 of the driving force of the left omnidirectional wheel 3 is less than the determination value (the determination result in S4 is No), the control device 7 determines that there is no abnormality in the transmission mechanisms 24 (S6).

The moving body 1 can detect an abnormality in the transmission mechanisms 24 based on the actual electric current value of each electric motor 20. As described above, since the control device 7 sets the angular velocity target value of each electric motor 20 such that the components $F_{1R}$, $F_{1L}$ along the reference line L1 of the driving forces of the left and right omnidirectional wheels 3 become equal to each other, the components $F_{1R}$, $F_{1L}$ along the reference line L1 of the driving forces of the left and right omnidirectional wheels 3 become equal to each other if there is no abnormality in the transmission mechanisms 24. However, in the case where any of the belts 28 is detached or broken, the load of the corresponding electric motor 20 is lowered, and thus, the actual electric current value of this electric motor 20 when the actual angular velocity value matches the angular velocity target value is lowered than in a normal time. As a result, the component along the reference line L1 of the driving force of the omnidirectional wheel 3 calculated from the actual electric current value of this electric motor 20 changes. Therefore, by determining whether the absolute value of the difference between the component $F_{1R}$ along the reference line L1 of the driving force of the right omnidirectional wheel 3 and the component $F_{1L}$ along the reference line L1 of the driving force of the left omnidirectional wheel 3 is greater than or equal to the determination value, the control device 7 can detect an abnormality in the transmission mechanisms 24.

Figure 12:
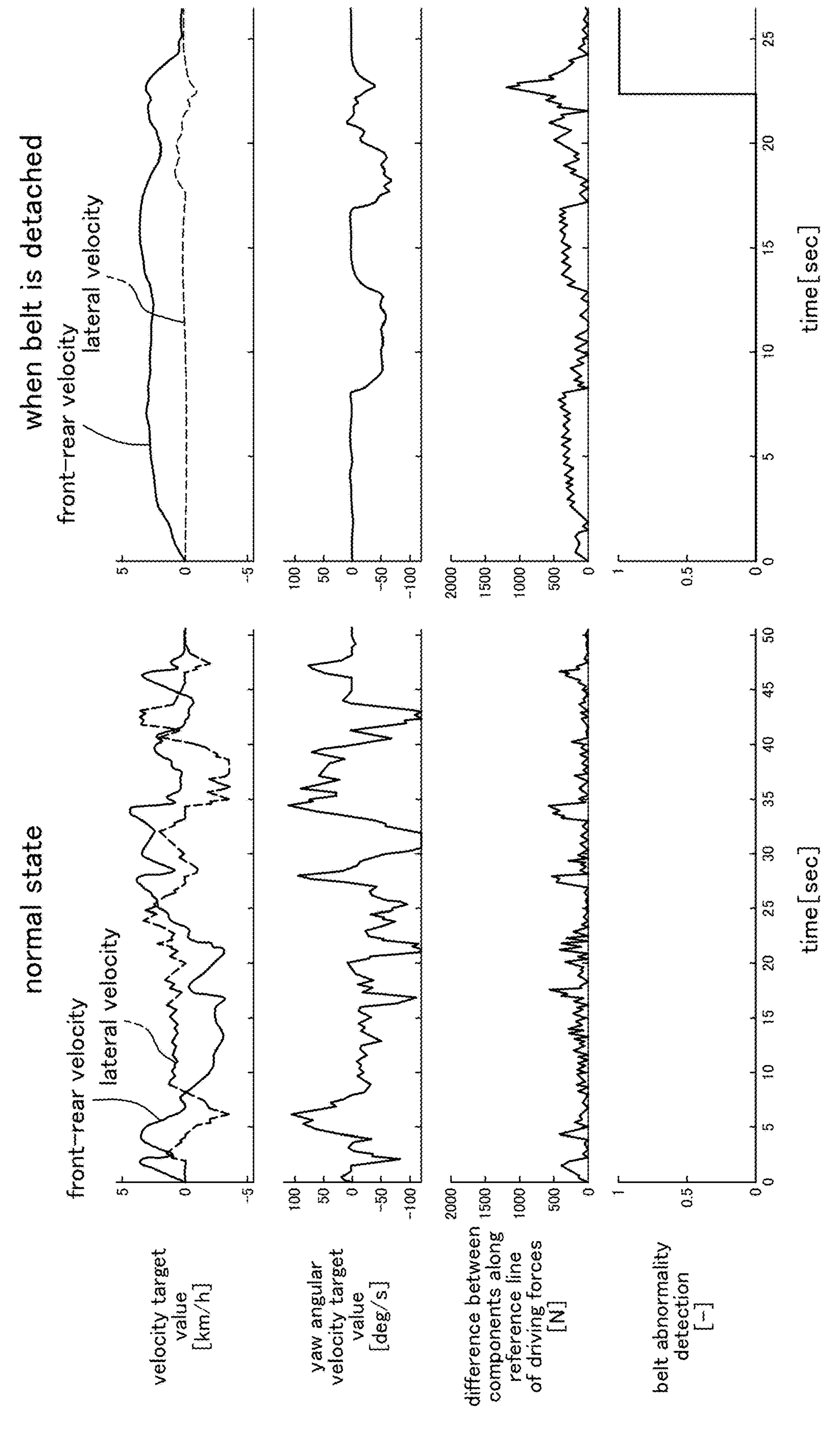
FIG. 12 is a time chart showing results of execution of the abnormality detection process according to the first embodiment.

FIG. 12 is a time chart showing results of execution of the abnormality detection process when the all transmission mechanisms 24 were normal and when the left belt 28LL of the left omnidirectional wheel 3L was detached. In this measurement, a moving body 1 in which the reference line L1 extends in the left-right direction and the angle between the x direction of each of the left and right omnidirectional wheels 3 and the reference line L1 is 90 degrees was used. In this moving body 1, the component along the reference line L1 of the driving force of each omnidirectional wheel 3 matches the lateral component (the y-direction component) of the driving force of each omnidirectional wheel 3. For each of the cases where the transmission mechanisms 24 are normal and where the belt 28LL was detached, the front-rear velocity target value, the lateral velocity target value, and the yaw angular velocity target value were given and the electric motors 20 were driven. The actual electric current value of each electric motor 20 at that time was measured, and the absolute value of the difference between the lateral components of the driving forces of the left and right omnidirectional wheels 3 was calculated from the actual electric current values of the electric motors 20. The determination value for detecting an abnormality in the belts 28 was set to 800N.

In the case where the all transmission mechanism 24 are normal, even though various front-rear velocity target values, lateral velocity target values, and yaw angular velocity target values were given, the absolute value of the difference between the lateral components of the driving forces of the left and right omnidirectional wheels 3 did not become greater than or equal to the determination value, and no abnormality was detected. On the other hand, in the case where the belt 28LL was detached, when the front-rear velocity target value, the lateral velocity target value, and the yaw angular velocity target value were set to certain values, the absolute value of the difference between the lateral components of the driving forces of the left and right omnidirectional wheels 3 became greater than or equal to the determination value, and an abnormality in the belts 28 was detected. For example, when the front-rear velocity target value, the lateral velocity target value, and the yaw angular velocity target value corresponding to when the moving body 1 drifts or undergoes lateral translation were given, the absolute value of the difference between the lateral components of the driving forces of the left and right omnidirectional wheels 3 became greater than or equal to the determination value.

Second Embodiment

Figure 13:
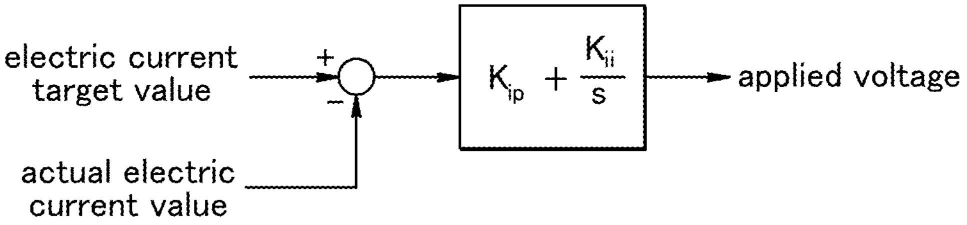
FIG. 13 is a block diagram showing a control block for each electric motor of a control device according to the second embodiment.
Figure 14:
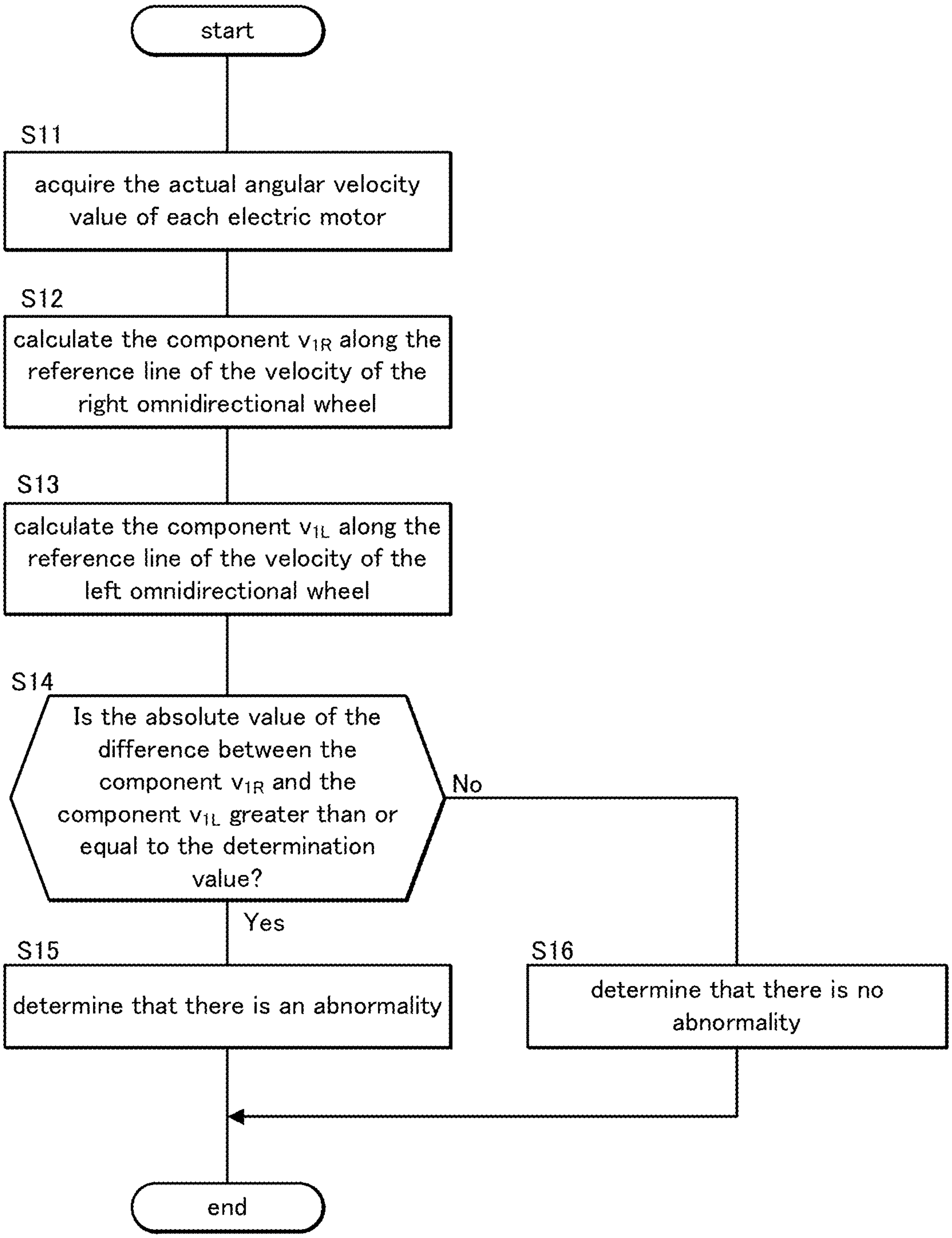
FIG. 14 is a flowchart of a process executed by the control device according to the second embodiment to detect an abnormality in the transmission mechanisms.

In the second embodiment, the control device 7 determines the front-rear velocity target value, the lateral velocity target value, and the yaw angular velocity target value of the moving body 1 based on the signal from the force sensor 6, and sets the electric current target value of each of the two electric motors 20 of each omnidirectional wheel 3 based on the front-rear velocity target value, the lateral velocity target value, and the yaw angular velocity target value. Then, as shown in FIG. 13, the control device 7 performs feedback control so that the actual electric current value of each electric motor 20 matches the electric current target value. In this case, the control device 7 can detect an abnormality based on the actual angular velocity value of each electric motor 20 instead of the actual electric current value of each electric motor 20. The control device 7 executes the abnormality detection process shown in FIG. 14 at a predetermined time interval. The control device 7 first acquires the actual angular velocity value of each electric motor 20 based on the signal from each angular velocity sensor 34 (S11).

Subsequently, the control device 7 calculates the component VIR along the reference line L1 of the velocity of the right omnidirectional wheel 3R based on the actual angular velocity value of each of the electric motors 20RL, 20RR of the right omnidirectional wheel 3R (S12). Further, the control device 7 calculates the component VIL along the reference line L1 of the velocity of the left omnidirectional wheel 3L based on the actual angular velocity value of each of the electric motors 20LL, 20LR of the left omnidirectional wheel 3L (S13).

In the following, one example of a method for calculating the component along the reference line L1 of the velocity of each omnidirectional wheel 3 from the actual angular velocity values of the two electric motors 20 of the omnidirectional wheel 3 will be described. Here, as seen in plan view, the direction perpendicular to the rotation axis A of each omnidirectional wheel 3 is referred to as the x direction, and the direction along the rotation axis A is referred to as the y direction. the x-direction component $v_{D,x}$ of the velocity $v_D$ of each omnidirectional wheel 3 can be calculated based on the sum of the actual angular velocity values of the two electric motors 20 and the speed ratio from each electric motor 20 to the main wheel 19. The y-direction component $v_{D,y}$ of the velocity $v_D$ of each omnidirectional wheel 3 can be calculated based on the difference between the actual angular velocity values of the two electric motors 20 and the speed ratio from each electric motor 20 to the main wheel 19. For example, the x-direction component $v_{D,x}$ and the y-direction component $v_{D,y}$ of the velocity $v_D$ of each omnidirectional wheel 3 can be calculated from the actual angular velocity values of the two electric motors 20 according to the following formulas (6) to (8).

$$\begin{cases} w_{H,L} = \dfrac{w_L S_L}{G_1} \\ w_{H,R} = \dfrac{w_R S_R}{G_1} \end{cases} \tag{6}$$

wherein $w_{H,L}$ is an angular velocity [rad/s] of the left drive disk 18 of the omnidirectional wheel 3, $w_{H,R}$ is an angular velocity [rad/s] of the right drive disk 18 of the omnidirectional wheel 3, $w_L$ is an angular velocity [rad/s] of the left electric motor 20 of the omnidirectional wheel 3, $w_R$ is an angular velocity [rad/s] of the right electric motor 20 of the omnidirectional wheel 3, $w_{D,x}$ is an x-direction angular velocity [rad/s] of the omnidirectional wheel 3, $w_{D,y}$ is a y-direction angular velocity [rad/s] of the omnidirectional wheel 3, $v_{D,x}$ is an x-direction velocity [m/s] of the omnidirectional wheel 3, and $v_{D,y}$ is a y-direction velocity [m/s] of the omnidirectional wheel 3.

As shown in FIG. 11, as seen in plan view, an angle defined between the x direction of the right omnidirectional wheel 3R and the reference line L1 is denoted by φ1 [rad], and an angle defined between the x direction of the left omnidirectional wheel 3L and the reference line L1 is denoted by φ2 [rad]. Then, the component $v_{1R}$ along the reference line L1 of the velocity of the right omnidirectional wheel 3R is represented by the following formula (9).

$$v_{1R} = v_{D,x}\cos\varphi 1 + v_{D,y}\sin\varphi 1 \tag{9}$$

Also, the component $v_{1L}$ along the reference line L1 of the velocity of the left omnidirectional wheel 3L is represented by the following formula (10).

$$v_{1L} = v_{D,x}\cos\varphi 2 + v_{D,y}\sin\varphi 2 \tag{10}$$

When $\varphi 1=\pi/2$, the component $v_{1R}$ along the reference line L1 of the velocity of the right omnidirectional wheel 3R becomes equal to the y-direction component of the velocity. Similarly, when $\varphi 2=\pi/2$, the component $v_{1L}$ along the reference line L1 of the velocity of the left omnidirectional wheel 3L becomes equal to the y-direction component of the velocity.

Next, the control device 7 determines whether the absolute value of the difference between the component $v_{1R}$ along the reference line L1 of the velocity of the right omnidirectional wheel 3 and the component $v_{1L}$ along the reference line L1 of the velocity of the left omnidirectional wheel 3 is greater than or equal to a predetermined determination value (S14).

When the absolute value of the difference between the component $v_{1R}$ along the reference line L1 of the velocity of the right omnidirectional wheel 3 and the component $v_{1L}$ along the reference line L1 of the velocity of the left omnidirectional wheel 3 is greater than or equal to the determination value (the determination result in S14 is Yes), the control device 7 determines that there is an abnormality in the transmission mechanisms 24 (S15). When the absolute value of the difference between the component $v_{1R}$ along the reference line L1 of the velocity of the right omnidirectional wheel 3 and the component $v_{1L}$ along the reference line L1 of the velocity of the left omnidirectional wheel 3 is less than the determination value (the determination result in S14 is No), the control device 7 determines that there is no abnormality in the transmission mechanisms 24 (S16).

Concrete embodiments of the present invention have been described in the foregoing, but the present invention can be modified in various ways without being limited to the above embodiments.

The invention claimed is:

1. A moving body, comprising:

a vehicle body;

a pair of left and right omnidirectional wheels provided on the vehicle body; and a control device configured to control the pair of omnidirectional wheels, wherein each of the omnidirectional wheels comprises a pair of drive disks, an annular main wheel disposed between the drive disks, a pair of electric motors each configured to rotate a corresponding one of the drive disks, a pair of transmission mechanisms each configured to transmit a rotational force of a corresponding one of the electric motors to a corresponding one of the drive disks, a pair of electric current sensors each configured to detect an electric current flowing through a corresponding one of the electric motors, and a pair of angular velocity sensors each configured to detect an angular velocity of a corresponding one of the electric motors, each of the main wheels comprises a core having a circular annular shape and multiple driven rollers rotatably supported by the core and contacting the pair of drive disks, the control device is configured to set an angular velocity target value of each of the electric motors based on a front-rear velocity target value, a lateral velocity target value, and a yaw angular velocity target value of the vehicle body and feedback-control each of the electric motors such that the angular velocity of each of the electric motors approaches the corresponding angular velocity target value, acquire an actual electric current value of each of the electric motors based on a signal from each of the electric current sensors, calculate, based on the actual electric current value of each electric motor, a component along a reference line of a driving force of each of the omnidirectional wheels, the reference line connecting ground contact points of the omnidirectional wheels, and determine that there is an abnormality when an absolute value of a difference between the components along the reference line of the driving forces of the omnidirectional wheels is greater than or equal to a predetermined determination value.

2. The moving body according to claim 1, wherein each of the transmission mechanisms comprises a pulley and a belt.

3. The moving body according to claim 1, wherein the control device is configured to set an electric current target value of each of the electric motors based on a difference between the angular velocity target value and an actual angular velocity value and to set a voltage to be applied to each of the electric motors based on a difference between the electric current target value and the actual electric current value.

4. A moving body, comprising:

a vehicle body;

a pair of left and right omnidirectional wheels provided on the vehicle body; and a control device configured to control the pair of omnidirectional wheels, wherein each of the omnidirectional wheels comprises a pair of drive disks, an annular main wheel disposed between the drive disks, a pair of electric motors each configured to rotate a corresponding one of the drive disks, a pair of transmission mechanisms each configured to transmit a rotational force of a corresponding one of the electric motors to a corresponding one of the drive disks, a pair of electric current sensors each configured to detect an electric current flowing through a corresponding one of the electric motors, and a pair of angular velocity sensors each configured to detect an angular velocity of a corresponding one of the electric motors, each of the main wheels comprises a core having a circular annular shape and multiple driven rollers rotatably supported by the core and contacting the pair of drive disks, the control device is configured to set an electric current target value of each of the electric motors based on a front-rear velocity target value, a lateral velocity target value, and a yaw angular velocity target value of the vehicle body and feedback-control each of the electric motors such that the electric current of each of the electric motors approaches the corresponding electric current target value, acquire an actual angular velocity value of each of the electric motors based on a signal from each of the angular velocity sensors, calculate, based on the actual angular velocity value of each electric motor, a component along a reference line of a velocity of each of the omnidirectional wheels, the reference line connecting ground contact points of the omnidirectional wheels, and determine that there is an abnormality when an absolute value of a difference between the components along the reference line of the velocities of the omnidirectional wheels is greater than or equal to a predetermined determination value.

* * * * *